Figure 1:
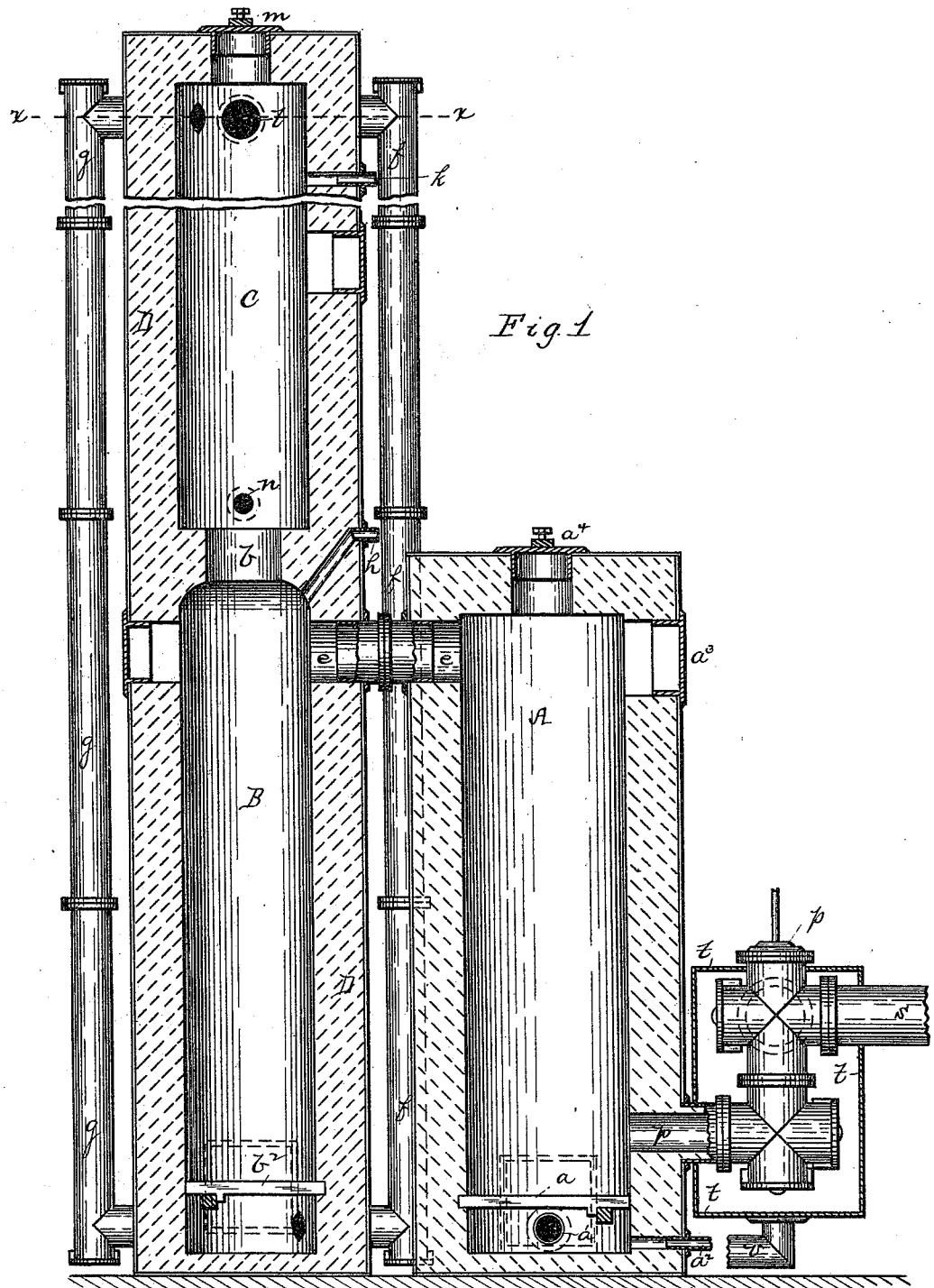

(No Model.) 3 Sheets—Sheet 1.

J. M. ROSE.
APPARATUS FOR THE MANUFACTURE OF GAS.

No. 408,536. Patented Aug. 6, 1889.

(No Model.) 3 Sheets—Sheet 2.
J. M. ROSE.
APPARATUS FOR THE MANUFACTURE OF GAS.
No. 408,536. Patented Aug. 6, 1889.
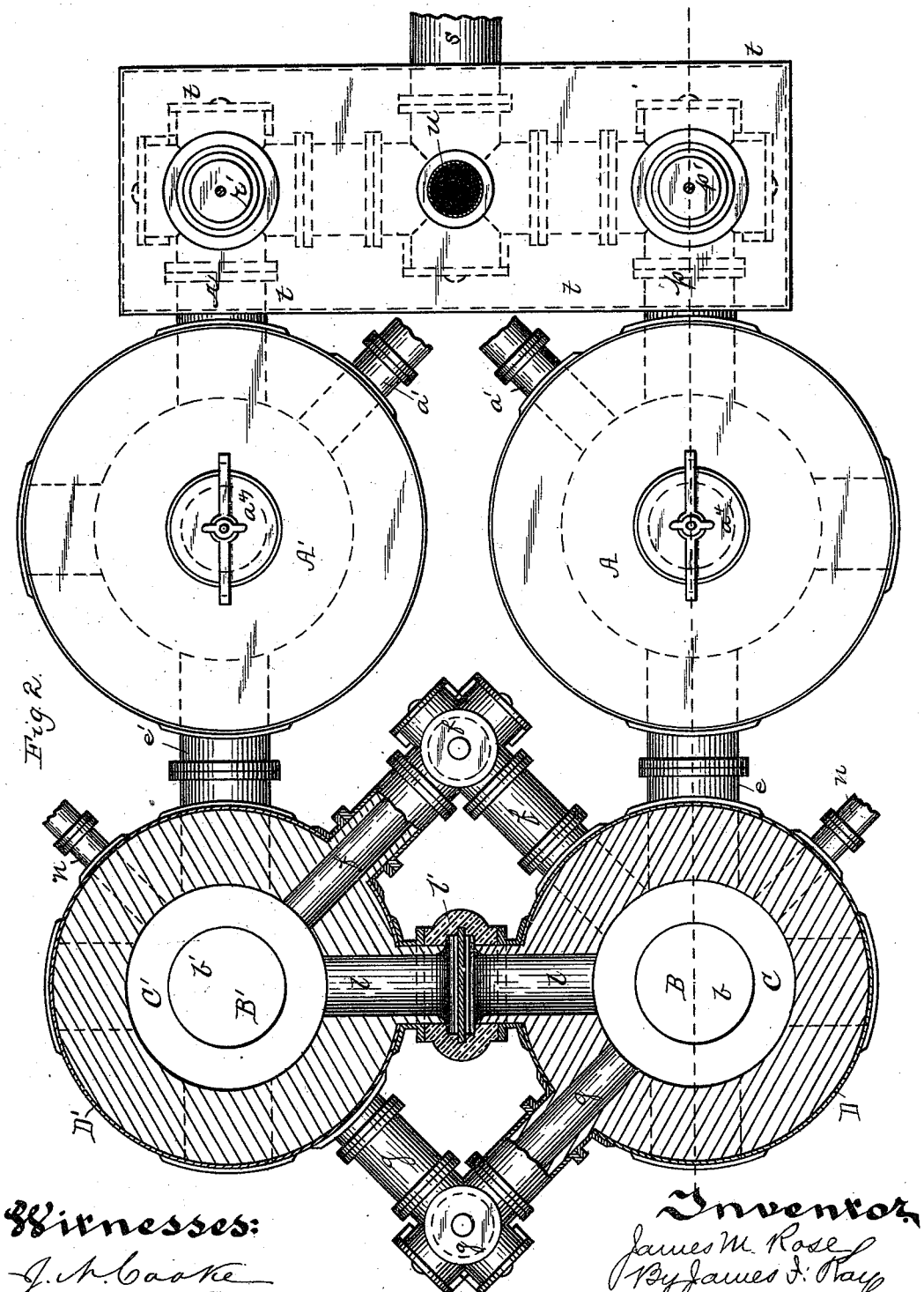

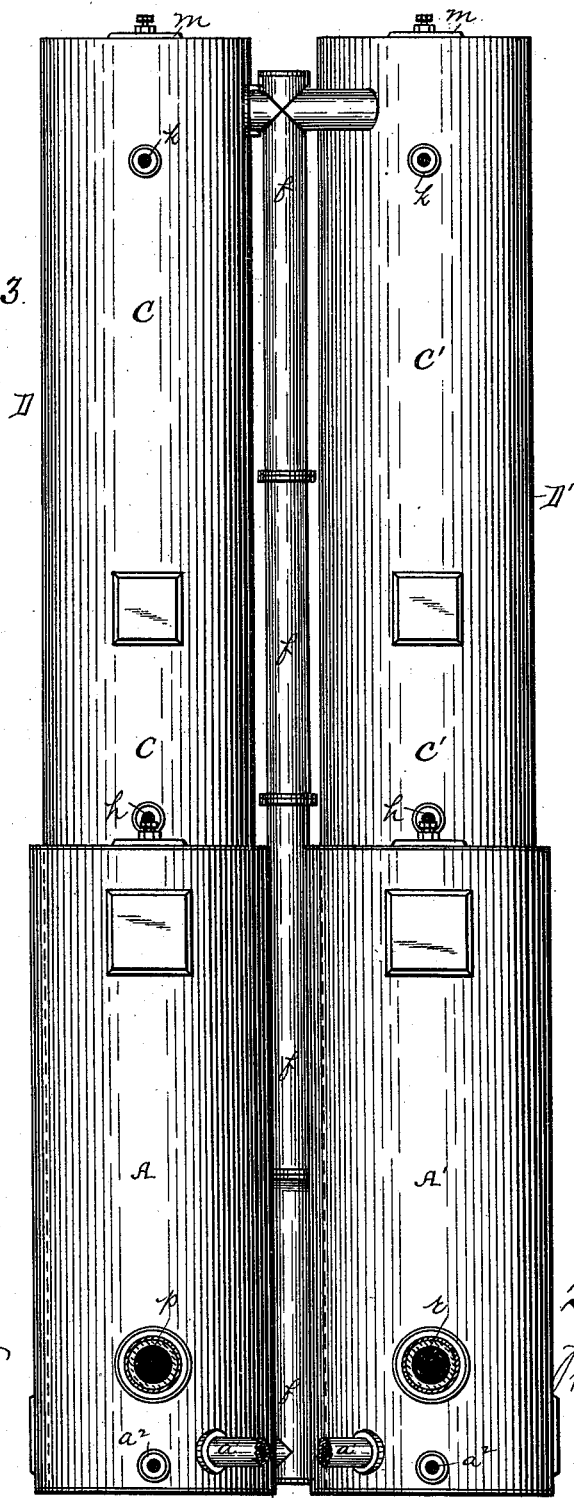

UNITED STATES PATENT OFFICE.

JAMES M. ROSE, OF ALLEGHENY, PENNSYLVANIA.

APPARATUS FOR THE MANUFACTURE OF GAS.

SPECIFICATION forming part of Letters Patent No. 408,536, dated August 6, 1889.

Application filed December 8, 1888. Serial No. 292,960. (No model.)

*To all whom it may concern:*

Be it known that I, JAMES M. ROSE, a resident of Allegheny, in the county of Allegheny and State of Pennsylvania, have invented a new and useful Improvement in Apparatus for the Manufacture of Gas; and I do hereby declare the following to be a full, clear, and exact description thereof.

My invention relates to the manufacture of gas, and especially to the manufacture of what is known as "fuel-gas"—namely, a gas useful for fuel and heating purposes—though a good quality of illuminating-gas may be formed by enriching the gas with light hydrocarbons during its manufacture.

My present invention relates to certain improvements in the apparatus employed for practicing the inventions described in certain other applications heretofore filed by me. The inventions set forth in those applications consist, generally stated, in forcing air through a mass of ignited coal or other carbon, and then introducing into and upon it a mass of refractory material, preferably coated with a heavy hydrocarbon, and steam, and passing the resultant products first through said mass of coated refractory material and then through fixing material, a liquid hydrocarbon—such as Lima oil—being preferably introduced before the gas is fixed, to increase the proportion of hydrocarbons therein, and the gas being fixed either by passing it through a mass of heated refractory material or through another mass of incandescent carbon, or both. In the manufacture of said gas in the manner I have set forth it is found that the nitrogen of the air which is forced into the apparatus is eliminated, combining with the hydrogen to form ammonia or combining with the hydrocarbons, and that this ammonia can be removed from the gas by absorbing it in water or causing it to unite with sulphuric or like acid. In practicing the said invention it is found desirable first to carry the gases from the cupola generator through the coated refractory material after the introduction of the heavy hydrocarbon—such as tar or asphalt and steam—to have said mass of coated refractory material gradually decreasing in temperature toward the end at which the gases pass from the same, as it assists in the chemical action whereby the nitrogen is taken up by the hydrogen or hydrocarbons, and as it provides for the collection of part at least of the materials formed in this chemical action at the base of the casing containing the said coated refractory material, it is desirable to carry the gases downwardly through the same. It is also desirable to fix the gases after the introduction of the lighter liquid hydrocarbons therein by passing them through a fixing material gradually increasing in temperature toward the delivery end, and also to carry them both through a heated refractory material to fix them and through a mass of incandescent carbon to insure the formation of a permanent gas and convert the carbonic acid into carbonic oxide. It is also desirable to provide for the reversal of the apparatus, so that when the ignited carbon is raised to a high heat by the air-blast it may be employed for the fixing of the gases, and after its temperature has been reduced by this action to blast it up by reversing the current and forming the generator-gas in such cupola generator.

The object of my invention is to provide an apparatus in which all these conditions can be obtained, and by which the processes above referred to can be practiced continuously in the formation of a fine quality of gas practically free from nitrogen and therefore of high heating qualities.

In providing such an apparatus, I employ two cupola generators and two casings at the side of and extending above the cupola generators, each casing containing two chambers, the lower ones containing the coated refractory material, and having means for introducing the tar or like heavy hydrocarbon, so that the gases from the generator may pass downwardly through the same, and the upper ones containing the refractory fixing material, through which the gases can be passed downwardly, and thence through the mass of incandescent carbon in one of the cupolas; and I connect the bases of the chambers containing the coated refractory material with the upper ends of the chambers containing the refractory fixing material by vertical pipes. The course of the gas through said chambers is as follows: The chambers having been previously heated as desired, the air under pressure passes upwardly through one of the cupola generators and into the lower chamber in one of the casings, and after the introduction of the steam and heavy hydrocarbon it passes downwardly through the coated refractory material and thence upwardly through the one of the pipes to the upper end of the other casing and downwardly through the heated refractory material therein, and thence downwardly through the mass of incandescent carbon in the other cupola generator, the products of combustion being carried downwardly through the masses of coated refractory material, so that it always decreases in heat from the entrance to the discharge end thereof, while the refractory fixing material is heated by radiation from the products as they enter from the cupola generator, and, if necessary, by a small portion of the generator-gas admitted and burned in the base of the fixing-chamber, so that said fixing-chamber has always a greater heat at the base thereof than at the upper part thereof.

My invention also consists in certain other improvements, which will be hereinafter more particularly set forth.

To enable others skilled in the art to make and employ my invention, I will describe the same more fully, referring to the accompanying drawings, in which—

Figure 1 is a longitudinal central section of one casing and cupola generator. Fig. 2 is a plan view of the cupola generators and air-heating box and a cross-section of the casings on the line $x\, x$, Fig. 1; and Fig. 3 is a face view of the generators and casings, the air-heating box being removed.

Like letters of reference indicate like parts in each.

In my improved apparatus the cupola generators A A' are formed of casings of plate metal lined with fire-brick, each having at the base thereof the grate-bars $a$, and the air-blast pipe $a'$ and steam-pipe $a^2$ communicating with said generator below the grate-bars, the chamber having, also, the feeding-port $a^3$ and the relief-valve $a^4$. The casings D D' are also built of plate metal and are lined with fire-brick, and they are divided into the two chambers B C in the casing D and B' C' in the casing D', and the cupola generators A A' communicate with the chambers B B', respectively, through the flues $e\, e'$, while the chambers B B' communicate with the chambers C C', respectively, through the flues $b\, b'$. At the lower ends of the chambers B B' are the grate-bars $b^2$, and leading from said chambers, respectively, are the vertical pipes $f\, g$, respectively, the pipe $f$ leading from the base of the chamber B, and rising beside said casings and communicating with the upper end of the fixing-chamber C' of the casing D', while the pipe $g$ leads from the base of the chamber B' and communicates with the upper end of the fixing-chamber C. Said pipes $f\, g$ are lined with fire-brick to protect the metal body thereof. Communicating with the upper ends of the chambers B B', respectively, is the injector $h$, through which steam and tar or other heavy hydrocarbon are introduced; and communicating with the upper ends of the chambers C C', respectively, are the injectors $k$, through which Lima oil or like liquid hydrocarbon and steam are injected into the said fixing-chamber. The upper ends of the fixing-chambers C C' also communicate through the flue $l$, controlled by the valve $l'$. The chambers C C' have also the relief-valves $m$, and communicating with the base of said chambers are the air-supply pipes $n$. The eduction-pipes $p\, r$ lead from the bases of the cupola generators A A', respectively, and communicate with the pipe S, leading to the hydraulic main, said pipes $p\, r$ being controlled by valves $p'\, r'$. In order to utilize the heat of the escaping gases in heating the air employed in making gas, I surround the said pipes with the plate-metal casing $t$, which may, if desired, be lined with fire-brick or protected with any suitable non-conducting material, so as to prevent the radiation of heat through said casing, and communicating with said casing are the air-supply pipes $u$ and the pipes $v$, leading therefrom to the different air-ports $a'\, n$, said air-supply pipes being controlled by suitable valves.

In making gas in said apparatus the cupola generators A A' are filled with coal, coke, or other suitable carbon, coke being preferred for the purpose, and the chambers B B' are filled with suitable hydrocarbon-bearing material, the preferred form being blocks or balls of fire-brick, which are coated with coal-tar, asphalt, or other like heavy hydrocarbon, so that a large amount of heavy hydrocarbon is exposed on the surface of said refractory material. The upper chambers C C' are filled with fire-brick or like refractory material in lumps or balls, forming a fixing material, as above referred to. A suitable supply of coal-tar, asphalt, or other heavy hydrocarbon, is contained in a tank, with which the injectors communicate, and a suitable supply of light hydrocarbon—such as Lima oil—is contained in a tank communicating with the injectors $k$. In order to heat up the several chambers, the relief-valves $a^4$ of the cupola generators are first opened, and the coal, coke, or other carbon employed in said chambers is ignited and the air-blast turned thereon, and the said chambers are gradually raised to the desired heat. When the fuel is properly ignited in said chambers, the relief-valves $a^4$ are closed and the relief-valves $m$ of the casings opened, and the products of combustion therein pass through the flues $e\, e'$ into the casings D D', and a supply of air is permitted to pass through the ports $n$ to the bases of the fixing-chambers C C', in which case part of the heated products rise into said fixing-chambers and are burned at the base thereof, so heating up the said chambers, the lower part of the fixing material then being raised to a higher heat than the upper part thereof. At the same time the remainder of the products of combustion pass downwardly through the hydrocarbon-bearing material in the hydrocarbon-chambers B B′, and thence upwardly through the pipes $f g$, said products then passing into the upper parts of the fixing-chambers and escaping through the relief-valves $m$.

When it is desired to make gas, the relief-valves $m$ are closed and the valve in one of the eduction-pipes—for instance, the valve $r'$ in the eduction-pipe $r$—is opened, and the air-supply pipe $a'$ at the base of the generator A′ is closed, the air-blast being continued through the generator A. The generator-gas formed in this chamber by the passage of the air upwardly through the mass of incandescent carbon then passes over through the flue $e$ into the hydrocarbon-chamber B, where it is met by steam and a heavy hydrocarbon entering through the injector $h$, a portion of the heavy carbon being gasified and the remainder passing downwardly into the refractory balls or broken material in said hydrocarbon-chamber B, and serving to coat the same or to renew the coating thereon, and a high heat being maintained at the upper end of said hydrocarbon-chamber. The gases so formed, consisting of the generator-gas, together with the vaporized hydrocarbon, the steam which is decomposed, and the nitrogen which passes over with the generator-gas, then pass downwardly through the hydrocarbon-bearing material in said chamber B, passing from the hotter portion of said chamber downwardly to the cooler portion at the base thereof, and it being found that in this course a chemical action takes place, whereby the nitrogen and hydrogen unite to form ammonia-gas, and certain portions of the nitrogen also unite with the hydrocarbons, and on account of the reduced temperature at the base of said chamber are condensed therein, and the remainder of the gases pass upwardly through the pipe $f$, which leads to the upper end of the fixing-chamber C′, the gases being cooled in passing through said pipe, and the chemical action on account of the cooling of the said gases being continued in said pipe $f$. As the gases enter the chamber C′ a further portion of steam and a light liquid hydrocarbon—such as Lima oil—is injected, and is vaporized by the steam and the heat of the chamber and the gases entering it and acts to enrich the gases formed, and the resultant gases so generated then pass downwardly through the fixing-chamber C′, which, as above described, gradually increases in heat from the entrance to the delivery end, and so acts the better to fix the gases and bring them to a stable condition, the vaporized Lima oil uniting with the gases carried over and thus enriching them. The gases then pass through the port or flue $b'$ into the upper end of the chamber B′, and thence through the flue $e'$ to the upper end of the cupola generator A′ and down through the incandescent carbon contained therein, the said body of incandescent carbon acting to break up any steam which may be carried over, and so increasing the amount of gases formed, and at the same time to convert into carbonic oxide any carbonic acid which may have been formed and to fix all the gases, forming a rich and stable gas either for fuel purposes or for illuminating purposes, according to the proportion of light hydrocarbon added thereto. The resultant gases then pass out through the eduction-pipe $r$, and thence through the pipe $s$ to the hydraulic main and receiving-tank, and in passing through said pipes the hot gases, by radiation through the walls of said chamber, act to heat the incoming air which is passing through the casing $t$, the heat of the finished gases being thus employed for heating the air-blast employed in generating the gas. During this operation the radiation of heat from the hot gases passing from the cupola generator A into the upper end of the hydrocarbon-chamber B acts to maintain the lower part of the fixing material in the chamber C (which is not then in use) at a high heat, and if this is not sufficient to properly heat said chamber a small portion of air may be admitted through the pipe $n$ at the base of the chamber C, and by opening the relief-valve of said chamber or the valve $l'$ in the flue $l$, connecting the upper ends of the fixing-chamber, a small portion of the gases can be burned in the lower end of said fixing-chamber, and so serve to hold it at the desired heat and to reheat it after it has been employed for fixing the gases; and if it is desired to save the products of combustion so obtained they can pass over through the flue $l$ into the other fixing-chamber C′ and mingle with the gases therein, and as the nitrogen will under the conditions then present unite with the nascent hydrogen formed by decomposition of the steam in the upper part of said chamber C′, and the carbonic acid will be converted into carbonic oxide in passing through the incandescent carbon in the cupola generator A′, the said fixing-chamber not in use can be maintained at the desired heat. This operation is continued until the body of carbon in the cupola generator A′ is so reduced in temperature that it will not act to fix the gases and convert the carbonic acid into carbonic oxide. When the current through the apparatus is reversed, the valve $r'$ being closed and the valve $p'$ in the eduction-pipe $p$ being opened, the other flues controlling the several air-blast pipes and ejectors being reversed in the same manner, the air-blast then passes up through the cupola generator A′, and through the chamber B′, pipe $g$, chamber C, and cupola generator A, the course taken being the same as above described, but in a reversed direction, and the fixing material in the fixing-chamber C′ being heated ready for the next operation, as above described.

By said apparatus, as the hydrocarbon-bearing material in the two treating-chambers B B' is only heated by the passage of the generator-gases downwardly through said material, when said chambers are employed for gas-making, it is evident that I am always enabled to maintain the materials in said chambers at the proper heat for gas-making, the entrance ends being of a higher heat than the delivery ends, and the temperature being gradually reduced within said chambers. I am also enabled to heat the fixing-chambers in the best manner for the fixing of the gases, as by heating them from the base, and carrying the products downwardly through them in the manner above described, I can obtain the gradually-increasing temperature in the direction of the course of the gases, and this with practically little or no expenditure of fuel. I also provide for the reversal of the apparatus, so that the generator through which the blast first passes is gradually heated up to a temperature higher than desirable for the making of generator-gas, and this chamber is thus brought to the proper condition for fixing the gases and converting the carbonic acid into carbonic oxide, and the fixing of the gases in such chamber again reduces its temperature to the heat proper for forming the generator-gas.

What I claim as my invention, and desire to secure by Letters Patent, is—

1. An apparatus for making gas, having two cupola generators, casings, each having a chamber at the base thereof provided with an oil-entrance for treating the gases, a chamber in the upper part thereof containing refractory material for fixing the gases, and pipes connecting the lower end of the lower or treating chamber of one casing with the upper end of the upper or fixing chamber of the other casing, respectively, substantially as and for the purposes set forth.

2. An apparatus for the manufacture of gas, having the cupola generator, the casing having the chamber in the lower part thereof provided with an oil-entrance for treating the gases, with the upper end of which the cupola generator communicates, and the chamber above the said lower chamber containing refractory material for fixing the gases and communicating with said lower chamber through a flue in the base thereof, substantially as and for the purposes described.

3. An apparatus for the manufacture of gas, having two casings, each having a chamber in the lower part thereof provided with an oil-entrance, and a chamber in the upper part thereof containing refractory material for fixing the gases, said chambers communicating through a flue, and pipes connecting the base of the lower or treating chamber in one casing with the upper end of the upper or fixing chamber in the other casing, respectively, substantially as and for the purposes set forth.

4. An apparatus for the manufacture of gas, having two casings, each having a chamber in the lower part thereof provided with an oil-entrance for treating the gases, and a chamber in the upper part thereof containing refractory material for fixing the gases, and a valve-controlled flue connecting the upper or fixing chambers in each casing, and two cupola generators communicating with the upper ends of the lower or treating chambers, substantially as and for the purposes set forth.

In testimony whereof I, the said JAMES M. ROSE, have hereunto set my hand.

JAMES M. ROSE.

Witnesses:
JAMES M. WEST,
THOS. S. WILTBANK.